United States Patent [19]

Harvey

[11] 4,107,710
[45] Aug. 15, 1978

[54] PHOTOGRAPHIC APPARATUS FOR USE WITH SELF-PROCESSING FILM UNITS

[75] Inventor: Donald M. Harvey, Webster, N.Y.

[73] Assignee: Eastman Kodak Company, Rochester, N.Y.

[21] Appl. No.: 780,149

[22] Filed: Mar. 22, 1977

[51] Int. Cl.² .............................................. G03B 17/50
[52] U.S. Cl. ..................................... 354/86; 354/135; 354/204
[58] Field of Search .................................. 354/83–86, 354/135, 142, 170, 171, 173, 212

[56] References Cited

U.S. PATENT DOCUMENTS

| | | | |
|---|---|---|---|
| 3,232,196 | 2/1966 | Sapp ....................................... | 354/172 |
| 3,369,468 | 2/1968 | Sapp ....................................... | 354/144 |
| 3,437,024 | 4/1969 | Downey et al. ....................... | 354/83 |
| 3,753,392 | 8/1973 | Land ....................................... | 354/86 |
| 3,771,426 | 11/1973 | Harvey .................................. | 354/86 |
| 3,810,210 | 5/1974 | Adamski et al. ...................... | 354/86 |
| 3,965,480 | 6/1976 | Eloranta ................................ | 354/83 |
| 3,967,304 | 6/1976 | Johnson et al. ....................... | 354/83 |
| 3,984,851 | 10/1976 | Goto ..................................... | 354/212 |
| 3,994,006 | 11/1976 | Ichii ...................................... | 354/212 |

FOREIGN PATENT DOCUMENTS 2,454,481 5/1976 Fed. Rep. of Germany ........... 354/135

*Primary Examiner*—John Gonzales
*Attorney, Agent, or Firm*—N. Rushefsky

[57] ABSTRACT

An improved photographic apparatus particularly suitable for the exposure and initiation of processing of a self-processing film unit includes a pivotable and translatable shuttle that includes a picker finger for engaging a trailing edge of a film unit and advancing the exposed film unit from its exposure position into the nip between a pair of opposed pressure members. The shuttle includes a rack adjacent one end thereof which is coupled to a gear drive that is also coupled with the pressure rollers. A spring biases the shuttle towards a position wherein the picker finger is disposed to engage the trailing edge of the film unit. After advancement of a film unit from its exposure position a latch or restraint supports the shuttle in an inactive but energized condition against the bias of the spring. The shuttle is releasable from the restraint in response to actuation of the body release. Exposure initiation means in the form of a lever that is pivotally and slidably coupled to the shuttle is associated with the shuttle so that upon release of the shuttle from the restraint the shuttle, under the action of the spring, pivots the lever to actuate a shutter.

An improved photographic apparatus is also disclosed wherein a film transport shuttle includes a hammer supported on a cantilevered spring-like beam. The movement of the shuttle in response to actuation of a body release is used to energize the hammer for striking of a piezoelectric crystal for generation of electrical energy.

8 Claims, 10 Drawing Figures

PHOTOGRAPHIC APPARATUS FOR USE WITH SELF-PROCESSING FILM UNITS

CROSS-REFERENCE TO RELATED APPLICATION

Reference is made to commonly assigned U.S. application Ser. No. 780,148, filed concurrently herewith in the names of Guilford Edwin Kindig and Chester William Michatek and entitled, PHOTOGRAPHIC APPARATUS WITH IMPROVED CONTROL OF CAMERA VIBRATION.

BACKGROUND OF THE INVENTION

1. Field of the Invention

The invention pertains to novel photographic apparatus for use with film units of the self-developing type. More particularly the invention pertains to an apparatus with improved means for initiating exposure of such film units and for advancing the film units from the exposure position to initiate processing. The invention further provides improved means for generation of electrical energy for the purpose of, for example, providing artificial illumination for the exposure of a film unit.

2. Description of the Prior Art

Photographic apparatus of the self-developing type are generally provided with a chamber for supporting a cartridge containing a plurality of film units with a foremost one thereof located in proper position for exposure. After exposure of the foremost film unit a shuttle is actuated to advance the exposed film unit into a pressure applying means to rupture a pod of chemical activator solution incorporated within the film unit and to uniformly spread the chemical solution over the image forming areas of the film. In the past various means have been proposed for synchronizing the several camera functions such as exposure and film unit transport so that these functions are performable in only the desired sequence thereby precluding anomalous operations by those perhaps unfamiliar with the operation of the camera. In designing cameras that are relatively simple to operate, it is generally necessary that the internal mechanisms of the camera be made more complex than would otherwise be required. Interestingly, it is also desirable to have the cameras that are the simplest to operate be relatively inexpensive to be attractive to the great numbers of people who do not wish to be troubled with the operation of a complicated camera but who instead enjoy obtaining pictures of loved ones, etc. The design of a camera that is simple to operate and which may be manufactured at relatively low cost represents a substantial challenge to the camera designer.

In the prior art numerous functional designs have been proposed for self-processing cameras. For example in U.S. Pat. No. 2,873,658 there is described a self-processing camera that comprises a movable rack having feet that are adapted to engage an edge of a film unit after exposure thereof and push the film unit from its exposure position through a pair of opposed non-driven pressure rollers. The plunger-like rack is coupled to the camera's shutter so that upon initial advancement of the rack an exposure of the film unit is made. Further movement of the rack moves the film unit through the pressure rollers and results in the spreading of a developer solution on the image forming portion of the film unit. The patent indicates that the camera described therein is particularly suited for pictures of 35mm size or smaller. The camera would not be particularly well suited for use with substantially larger film formats such as the approximately 4 inches (10cm) square size known presently for instant prints since it is undesirable to push a film unit of relatively large dimension through non-driven pressure rollers. The pressure rollers are generally required to be heavily spring biased towards one another and a relatively large force would be necessary to push a large film unit between them, thereby raising the likelihood of damage to the film unit.

In another approach disclosed in U.S. Pat. No. 3,767,404, a picker device is provided which includes a film engaging portion at one end thereof for engaging a trailing edge of an exposed film unit and a rack portion at an opposite end for engaging a gear driven by a hand-crank. The gear is also coupled to a pressure roller and rotation of the crank advances the picker unit from its rearwardmost position forwardly so that a film unit is eventually engaged and moved into the pressure applying means. Rotation of the crank simultaneously drives the pressure roller so that the pressure roller moves the film unit through the pressure applying means. The patent further discloses that a cam may be provided to disengage the picker from the gear and hold the picker unit in its forwardmost position out of engagement with the gear after delivery of the film unit into the pressure applying means. The picker unit remains in this latter position until released by operation of the camera's body release or shutter release whereupon a spring urges the picker unit to be moved back to its rearwardmost position after operation of the shutter. Inasmuch as actuation of the shutter occurs prior to release of the picker unit from its latched position additional mechanisms would be needed to preclude the possibility of the operator inadvertently exposing a film unit twice prior to processing of the film unit.

SUMMARY OF THE INVENTION

It is one object of the invention therefore to provide a relatively simple photographic apparatus which minimizes the likelihood of inadvertently obtaining a double exposure upon a film unit or the occurrence of other anomalous results in the operation of the apparatus.

It is another object of the invention to provide a relatively simple photographic apparatus that may be utilized with minimum occurrence of anomalous operations which apparatus includes means for actuating a shutter to expose a film unit of the type referred to herein and means for generating electrical energy such as for providing artificial illumination to supplement ambient light exposure of a subject being photographed.

These and other objects, which will become apparent after a review of the description of the preferred embodiments of the invention, are realized by providing photographic apparatus for effecting exposure and processing of a self-processing film unit of the type referred to herein, such apparatus including exposure means, a shuttle, spring-biased towards a retracted position and having a film engaging portion, and drive means for enabling the shuttle to advance the film unit into pressure applying means for processing of the film unit. The apparatus is provided with restraining means to hold the shuttle in an energized condition against the bias of the spring after the shuttle has advanced the film unit into the pressure applying means. The shuttle is released from the restraining means and allowed to pivot and translate towards the trailing edge of the film unit in response to actuation of the body release. The latter mentioned movement of the shuttle is used to initiate exposure of the film unit through a coupling which pivotably and slidably couples the shuttle to an exposure initiating lever. The movement of the shuttle to advance a film unit under the drive imparted by the drive means is used to feed the film unit into the pressure applying means.

The invention also is directed to a piezo hammer that is mounted on a film picking shuttle and in response to actuation of a body release is cocked and made to strike a piezoelectric member during movement of the shuttle towards a trailing edge of the film unit.

DESCRIPTION OF THE PREFERRED EMBODIMENTS

Because photographic apparatus, such as cameras, for film units of the self-processing type are well known, the present description will be directed in particular to elements forming part of or cooperating more directly with the present invention. Apparatus and film elements not specifically shown or described herein are selectable from those known in the prior art.

Figure 1:
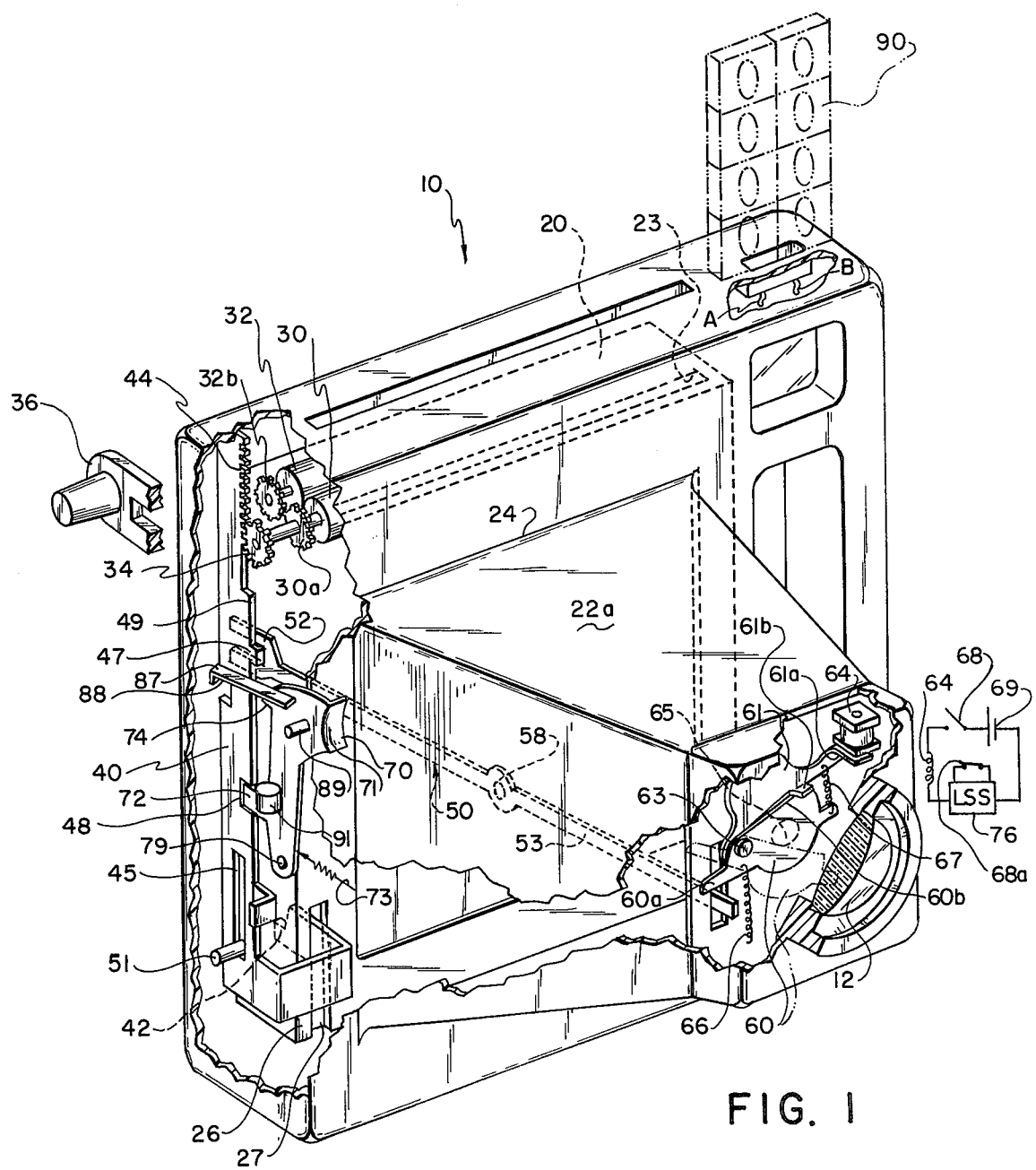
FIG. 1 is a perspective view of a photographic apparatus comprising one embodiment of the invention.

With reference now to FIG. 1 there are shown portions of a camera 10 of the kind suitable for receiving and exposing self-processing film units. The camera 10 includes a lens 12, a plurality of walls (not shown) defining a chamber for supporting a cartridge 20 containing a plurality of self-processing film units stacked one upon another. The cartridge 20 and its contents may be similar to those that are known and the contents may include, in addition to the film units, a dark slide to protect the film units from light prior to introduction of the cartridge into the camera. A front wall of the cartridge includes an aperture 24 through which a foremost film unit 22a supported in the cartridge may be selectively exposed by the camera. A narrow slot 23 provided in one end of the cartridge permits an exposed film unit to exit therethrough for movement into the camera's pressure applying means which may take the form of opposed pressure rollers 30, 32. The mechanism for movement of the film unit into the pressure applying means comprises an elongated shuttle 40 having a film-engaging picker finger 42 formed adjacent one end thereof. The picker finger is adapted to be moved into a narrow opening 26 provided therefor in the cartridge, which opening provides access to the picker of a trailing edge 27 of the foremost film unit.

Located adjacent the opposite end of the shuttle in the direction towards the leading edge of the foremost film unit 22a is a gear rack 44 which is formed on a longitudinal edge 49 of the shuttle and is adapted to engage or cooperate with a spur gear 34. Gear 34 may be supported concentrically with roller 30 and keyed with roller 30 so that the roller will be driven when rotational drive is imparted to gear 34. The source of drive to gear 34 may consist of a hand crank 36 as shown or alternatively a suitable motor. In order to provide sufficient pressure to a film unit that is being moved through the rollers, it is desirable to mount the rollers 30, 32 so that a spring (not shown) or some other means urges the two rollers towards one another to form a nip. In the embodiment of FIG. 1, roller 32 is mounted for rotational movement about its axis as well as for limited translational movement away from roller 30, against the bias of the spring, in response to movement of a film unit between the rollers. Roller 30 is preferably a fixed roller and mounted for rotation only. Roller 30 is drivingly coupled to roller 32 by gears 30a, 32a which are fixedly mounted to their respective rollers.

The shuttle 40 is mounted for pivotal and translational movement by a pin 51 that is rigidly attached to the frame of the camera and which is further located in a longitudinally extending slot 45 formed in the shuttle. Intermediate the rack and the picker the shuttle also includes a finger 47 which is located within a fork-like end 52 of an exposure initiation lever 50 that is pivotably mounted to the frame of the camera by a pin 58 and has at an opposite end thereof an arm 53 that cooperates with an arm 60a of a shutter opening blade 60. The location of the finger 47 within the forked end 52 provides a pivotal and slidable connection between the shuttle and the exposure initiation lever. The shuttle also includes a notch 48 formed on longitudinal edge 49. A tab 72 formed on a body release button 70 is adapted to be located within this notch and when so located functions as a latch or restraint to block translational movement of the shuttle. The body release button 70 includes a surface 71 that extends externally of the camera to permit the operator of the camera to depress the button for initiation of an exposure. The body release is pivotably mounted to the frame of the camera by a pin 79 and is biased by a spring 73 so that the spring biases the tab 72 into locking engagement with the notch 48.

In addition to the shutter opening blade 60, the shutter may further include a shutter closing blade 61. Both shutter blades, 60, 61 are supported on a shutter mounting board (not shown), in front of an appropriate diaphragm opening 65 and the blades are each pivotable about a pin 63 which secures the blades to the board. An electromagnet 64 is supported on the board adjacent a tab 61a formed on shutter closing blade 61 so that upon energization of the electromagnet the tab will be attracted to and held by the electromagnet for a period of time determined by suitable, known, electronic controls. The controls may be of the kind which, for example, include a light sensitive element that provides a switching signal after an appropriate exposure time related to the level of ambient light. Two springs 66 and 67 are associated with the shutter blades. The first, is a return spring 66 which biases the shutter opening blade 60 to its normal position in which the blade overlies and covers the diaphragm aperture 65. The other spring is coupled between the two blades and its function will be more apparent after a description of the operation of the shutter. The specific details of the shutter as described herein form no part of my invention and are provided for purposes of completeness of description. Since these details are merely representative of a possible shutter that may be used with the invention, other shutters, such as those selectable from the prior art, may also be used.

Figure 2A:
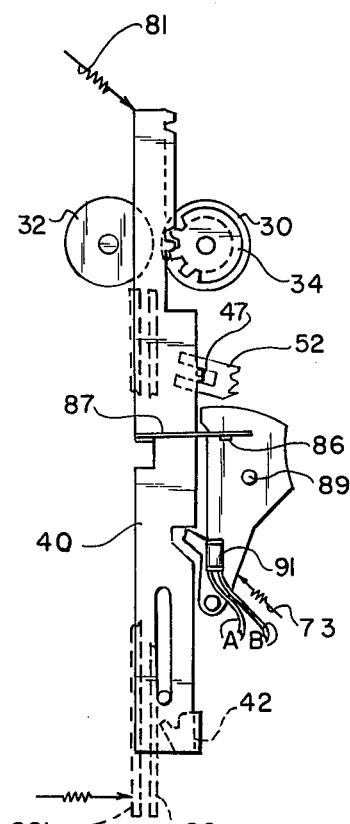
FIGS. 2a, b, c, d, e and f are schematics showing the various relative positions of certain of the elements illustrated in FIG. 1. For purposes of clarity, some elements shown in FIG. 2a are omitted from FIGS. 2b–2f.
Figure 2B:
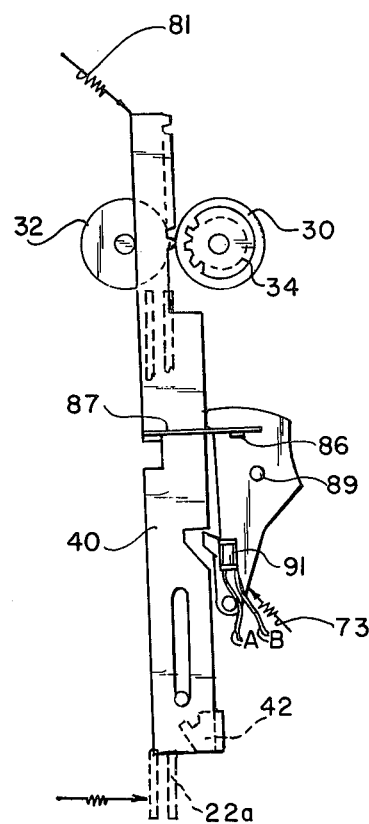
Figure 2C:
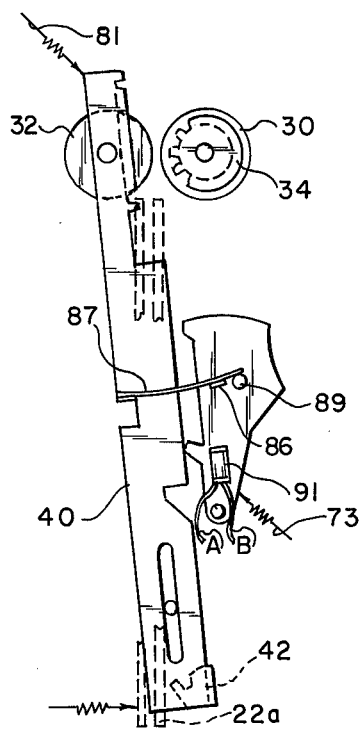
Figure 2D:
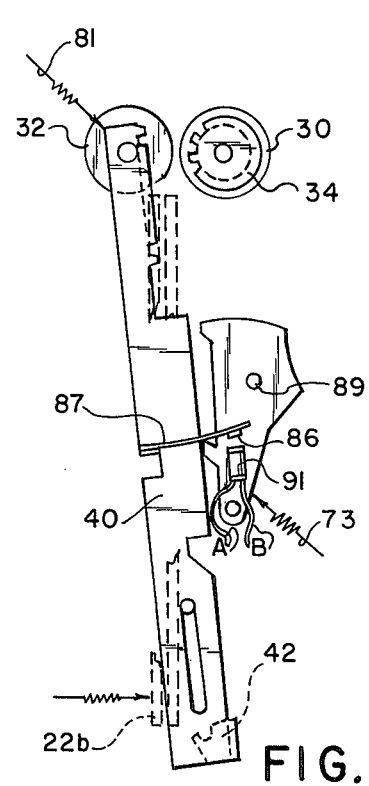

The camera of FIGS. 1 and 2a is shown with the elements thereof located in a cocked or energized position prior to initiation of an exposure of a foremost film unit 22a. Upon depression of body release button 70 by the operator of the camera a second tab 74 located on the body release button is moved into engagement with longitudinal edge 49 of the shuttle. It will be noted that tab 74 is located further from the pivot pin 79 than is tab 72. Movement of tab 74 into the edge forces the shuttle to be pivoted counterclockwise about pin 51 so that notch 48 moves out of engagement with tab 72 (see FIGS. 2b, 2c). Once free of the latch, the shuttle moves rapidly downwardly to its lowermost position shown in FIG. 2d under the bias of a strong spring 81 which is connected to the shuttle and to the frame of the camera. An important consideration in the downward movement of the shuttle is that picker finger 42 should be out of engagement with or make minimal contact with the film units as the shuttle descends under the influence of spring 81 to avoid possible jamming of the picker finger against the film unit 22a. This is particularly important where the picker finger is rigid to ensure proper picking of a film unit that is tightly packed within the film cartridge. It will be noted from FIGS. 1 and 2a that the picker finger is located in front of the foremost film unit 22a. During downward movement of the shuttle, (see FIGS. 2c, 2d) the tab 72 will be urged by the operator against edge 49 of the shuttle and this will ensure that the orientation of the picker finger is such that it is pivoted forwardly and out of contact with the film unit 22a. The movement of the shuttle to its downward terminus may be made to occur in such a short time period that the operator will not have time to release the body release from its depressed position shown in FIG. 2c. Alternatively, other means may be provided, see FIG. 3, for ensuring that the picker finger does not ride along or does not become jammed against the foremost film unit during its downward travel. The downward movement of the shuttle forces the lever 50 to pivot counterclockwise so that arm 53 thereof moves arm 60a of the shutter opening blade 60 and thereby pivots this blade in a clockwise direction from its closed position shown in FIG. 1 to an open position (shown in phantom) wherein it uncovers aperture 65 to commence exposure of film unit 22a. In the process of the blade 60 pivoting to its open position the blade return spring 66, which is connected to the arm 60a and the frame of the camera, is energized. The spring 67 which couples the two blades, is also energized due to the immobilizing of the shutter closing blade 61 by the electromagnet 64. The electromagnet is energized by the closing of a switch 68 during initial movement of the body release 70 towards edge 49 of the shuttle. The closing of switch 68 completes an electrical circuit between a battery 69, a light sensitive switch 76 and the electromagnet. When the shutter opening blade 60 uncovers the aperture 65 a normally closed switch 68a associated with the light sensitive switch 76 opens to commence integration of light by LSS 76. After an appropriate exposure time as determined by the LSS 76, the circuit will be "opened" and the electromagnet will be de-energized. Upon de-energization of the electromagnet the shutter closing blade 61 will pivot clockwise, under the bias of spring 67, about its supporting pin 63 towards the shutter opening blade 60. This pivoting movement will move the closing blade over the aperture 65 and the exposure of the film unit 22a will be over. The closing blade 61 will stop its pivoting when a tab 61a on the shutter closing blade engages an edge 60b on the shutter opening blade. In the event that the body release is inadvertently actuated at this point additional exposures of the film unit will not occur since the shuttle when in its retracted position cannot actuate the shutter.

Figure 2E:
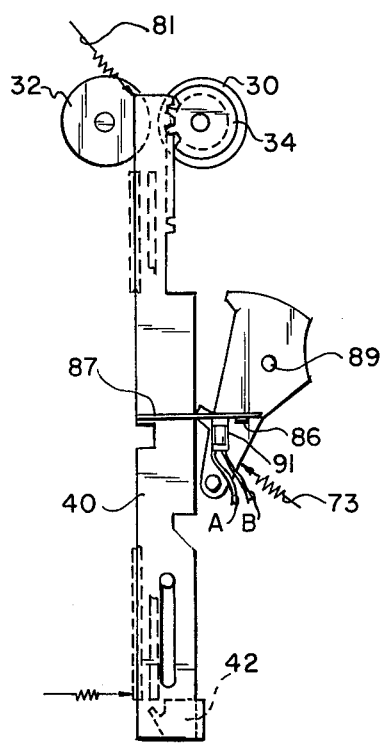
Figure 2F:
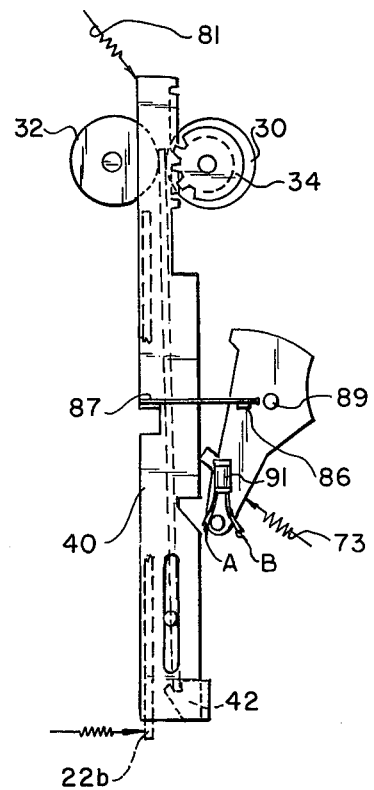

The shutter spring 81, in addition to biasing the shuttle towards the trailing edge of the film unit, also biases the shuttle for pivotal movement favoring engagement of the gear rack 44 with spur gear 34. With reference now to FIGS. 2e, 2f the release of the body release button 70 by the operator allows the gear rack to pivot into engagement with gear 34. The edge 49 of the shuttle will be urged by spring 81 against tab 72 of the body release thereby pivoting the body release in the clockwise direction. The picker finger 42 as may be noted from FIG. 2e, is now disposed just rearwardly of the trailing edge 27 of film unit 22a and is adapted upon advancement of the shuttle to engage this film unit at its edge and transport the film unit between the pressure rollers 30, 32. The exposed film unit 22 is removed from cartridge and introduced into the roller nip for processing and for removal from the camera through film exit slot 38 by clockwise rotation of the hand crank by the operator. Turning of the crank in this manner moves the picker finger 42 firstly into engagement with a portion of the trailing edge 27 of film unit 22a. Thereafter the picker finger and film unit 22a move toward the pressure rollers. Eventually the latch tap 72 moves into notch 48 and the shuttle is caught in this position (see FIG. 1) and blocked from movement, under the bias of now energized spring 81, toward the trailing edge of the next film unit to be exposed. The length of the gear rack is such or the number of teeth provided is such that when the shuttle is latched by tab 72 the continued clockwise rotation of the hand crank will not meaningfully advance the shuttle but will serve to continue to drive the pressure rollers for removal of the film unit from the apparatus. In addition the operation of the latch will also serve to block counterclockwise rotation of the crank and thereby precludes the occurrence of some anomalous results such as the picking of two film units for but one exposure. During advancement of the shuttle toward the pressure rollers the arm 53 of lever 50 is pivoted clockwise about pin 58 and thereby releases the shutter opening blade 60 which under the bias of return spring 66 pivots counterclockwise towards its normal position where it overlies aperture 65. In the course of pivoting to this position the edge 60b on the shutter opening blade engages the tab 61b on the closing blade so that both blades pivot to the position shown in FIG. 1. During this pivotal movement the aperture 76 continues to be blocked by one or both of the shutter blades.

Commensurate with one of the objects of the invention there is provided improved means for generating electrical energy such as for providing artificial illumination for exposure of a film unit. The means for generating such energy will now be described with reference to use of the energy to enable flash producing devices known in the art as "flip-flash" arrays; however those skilled in the art will appreciate that other suitable flash devices and/or energy using devices may also be used. The flip-flash array 90 (shown in phantom) includes a plurality of bulb-containing compartments each of which is adapted to provide a flash of light. Suitable controls are provided on the device so that only one bulb is "fired" at the time of exposure of one film unit. The bulbs each include a chemical primer that is responsive to a high level electrical voltage pulse from the camera. It is generally known that the source of the pulse may comprise a piezoelectric crystal and an energized hammer located in the camera to strike the crystal concurrently or approximately concurrently with the opening of the shutter. According to one aspect of the invention, the hammer 86 is mounted on the shuttle 40. As shown in FIG. 1 the hammer may be mounted on a springlike beam 87 that is cantileveredly supported by a tab 88 that extends generally perpendicularly from the plane of the generally flat shuttle 40. The beam is supported so as to be generally uniformly spaced from the plane of the shuttle. Upon depression of the body release button 70 in the manner heretofore described to initiate exposure of a film unit the shuttle descends rapidly from its advanced position shown in FIG. 1 towards the trailing edge of the foremost film unit. The inward depression of the body release button locates a pin 89 formed on the body release in a position to be struck by the unsupported end of the beam during the downward movement of the shuttle. The striking of the beam against the pin 89 energizes the hammer and with further downward displacement of the shuttle the energized hammer snaps by the pin and impacts upon the piezoelectric crystal 91 which is immovably supported by the frame of the camera. The voltage generated by the crystal upon impact is delivered via appropriate circuitry (A,B) to the socket which supports the flipflash to the camera. Since the exposure initiating lever 50 and hammer 86 are both coupled to the shuttle there is provided synchronization of the flash generating and exposure initiating functions by a relatively simple apparatus. During advancement of the shuttle towards its uppermost or advanced position for picking of a film unit as shown in FIGS. 2e-f-a, the body release is no longer depressed and the strong spring 81 acting through the shuttle locates the body release in a forward position against the bias of the relatively weaker spring 73. In this forward position of the body release the pin 89 is so located that it will not block movement of the beam during movement of the shuttle towards its advanced position.

Figure 3A:
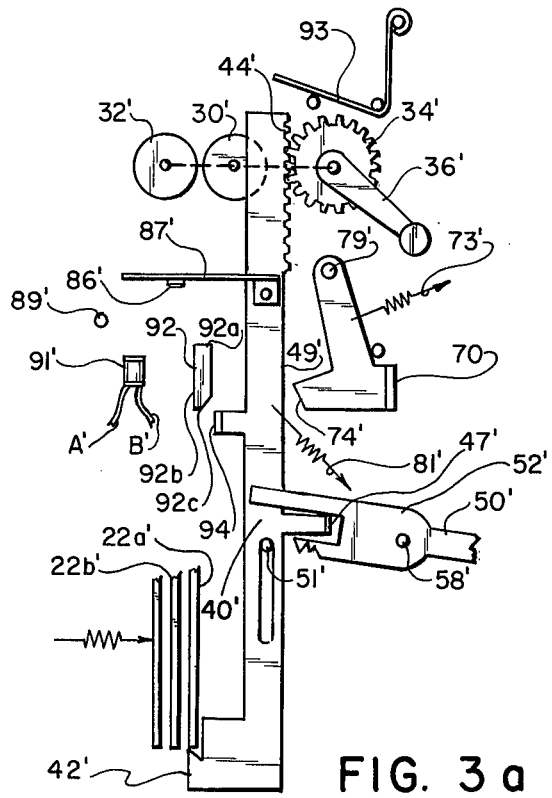
FIGS. 3a, b and c are schematics showing another embodiment of the invention.
Figure 3B:
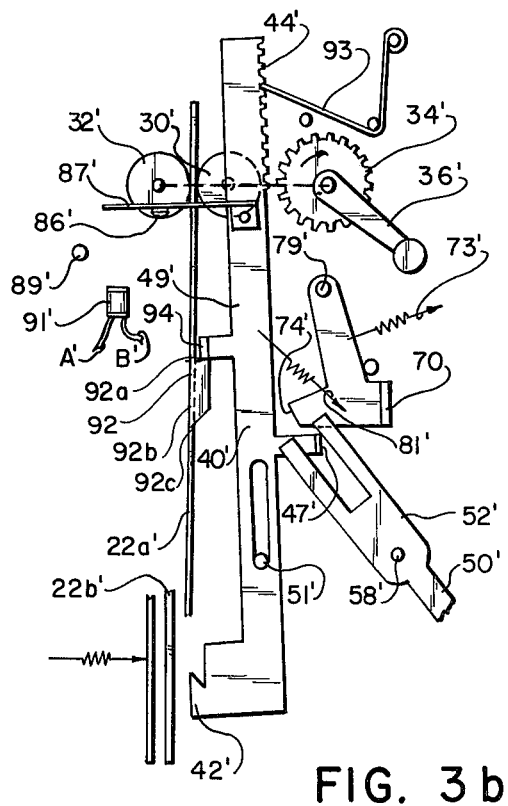
Figure 3C:
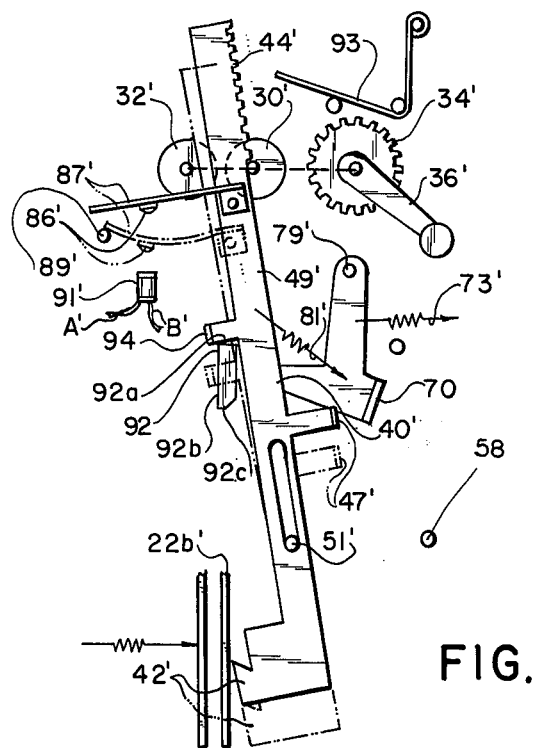

With reference now to FIG. 3 an alternative embodiment is described which provides more precise control over the movement of the shuttle. The elements associated with the exposure of the film unit are not shown in this figure but may be similar to those shown and described with respect to FIG. 1. In this embodiment analogous elements to those in FIG. 1 are denoted with the same numeral but for the addition of a prime ('). The apparatus of the embodiment of FIG. 3 includes an island 92 which extends from the frame of the camera. With clockwise rotation of the crank 36' gear 34' is similarly rotated and the shuttle 40' is moved upwardly against the bias of spring 81' to remove an exposed film unit 22a' or protective cover from the camera (see FIG. 3a). Although not shown, the pressure rollers 30', 32' are coupled to gear 34' by a suitable gear coupling. Upon reaching its upwardmost position (see FIG. 3b) the shuttle engages a torsion spring 93 which pivots the shuttle counterclockwise about the pivot pin 51' so that the gear rack 44' is removed from engagement with the spur gear 34'. An "L" shaped tab 94 extends from the shuttle. The tab 94 is adapted to rest on the top edge 92a of island 92 and support the shuttle in an inactive but energized condition when the shuttle has been pivoted to the position shown in FIG. 3b by spring 93. The surface 92a thus cooperates with the tab 94 to support the shuttle in an advanced position and prevent the return of the shuttle to its retracted position under the bias of the strong spring 81'. With continued clockwise rotation of the handcrank by the operator, drive to the pressure rollers 30', 32' will continue for removal of the film unit from the camera. However, since the gear rack has been moved out of engagement with the gear 34' by spring 93 no interaction between the shuttle and the gear 34' will occur while the shuttle is being restrained in the advanced position. In order to initiate an exposure of the next succeeding film unit 22b', the body release button 70' (see FIG. 3c) is depressed so that a tab 74' moves against the shuttle edge 49'. In response to movement of the body release button the shuttle 40' pivots about the pin 51' and the tab 94 is pivoted off the island's top edge 92a and descends along the side edge 92b thereof under the influence of spring 81'. During the descent of the shuttle, the picker finger 42' is located forwardly of the now foremost film unit 22b' and therefore the film unit does not interfere with the movement of the shuttle. In addition the finger 47', which is located in the forked-end 52' of lever 50', urges the lever to pivot counterclockwise about pin 58' to thereby operate the shutter in the manner described with reference to the embodiment of FIG. 1. Upon reaching the bottom edge 92c of the island and assuming the operator has released the body release button, the tab is no longer constrained by the island and spring 81' forces the shuttle to pivot clockwise about pin 51' thereby placing the shuttle in position for engagement of the picker finger with the trailing edge of the film unit 22b' and of the rack 44' with the drive gear 34'. The body release button 70', when released by the operator, pivots about pin 79' to its initial position shown in FIG. 3a under the bias of spring 73'. The crank 36' may now be rotated clockwise to initiate processing and removal of exposed film unit 22b' from the camera.

The operation of the electrical energy generating system in the embodiment of FIG. 3 is similar to that described for the embodiment of FIG. 1, except that the pin 89' for cocking the hammer 86' is connected to the frame of the camera rather than to the body release 70'.

The invention has been described with reference to a shuttle having a linear gear rack. Other configurations are also possible for example an "L" shaped rack may be used, see U.S. Pat. No. 3,232,196. In using such a rack, one leg of the rack can be used to translate the shuttle to an advanced position, while the other leg of the rack may be used to pivot the shuttle onto a restraining device for maintaining the shuttle in the advanced position.

Still other modifications of the invention may be made. In this regard attention is directed to the patent application to which reference has been made above.

From the above description it will be apparent to those skilled in the art that a relatively simple photographic apparatus has been described which is highly suited for use in apparatus for exposing and initiating processing of self-processing film units.

The invention has been described in detail with particular reference to preferred embodiments thereof, but it will be understood that variations and modifications can be effected within the spirit and scope of the invention.

I claim:

1. Photographic apparatus for effecting exposure and initiating processing of a self-processing film unit, the apparatus comprising:

means for locating a film unit in position for exposure;
   exposure means for exposing the film unit;

rotatable pressure applying means for receiving a film unit and for initiating the processing of the film unit after the exposure;

a shuttle including film unit engaging means for advancing the film unit from an exposure position to a position in which it may be received by the pressure applying means;

means for supporting the shuttle for pivotal and translational movement;

spring means for biasing the shuttle for pivotal and translational movement of the film unit engaging means in a direction away from said pressure applying means and towards a retracted position wherein the film unit engaging means is disposed to engage a film unit in its exposure position and is adapted upon movement of the shuttle to an advanced position to engage the film unit and to initiate advancement of the film unit towards the pressure applying means;

drive means including gear means for rotating the pressure applying means prior to receipt of a film unit therein and for translating the shuttle from the retracted position towards the advanced position to introduce the film unit into the pressure applying means;

a rack on the shuttle cooperating with the gear means whereby rotation of the gear means drives the shuttle so that the film engaging portion thereof is driven towards the pressure applying means;

restraint means for supporting the shuttle in the advanced position and for preventing the return of the shuttle to its retracted position under the bias of the spring means;

body release means actuatable by the operator of the apparatus for initiating exposure of a film unit by removing the restraint upon the shuttle to permit the shuttle to move towards the retracted position under the bias of the spring means; and lever means pivotably and slidably coupled to the shuttle and responsive to the movement of the shuttle from the advanced position towards the retracted position and operatively associated with the exposure means for effecting commencement of the exposure of the film unit by the exposing means.

2. The apparatus of claim 1 and including piezoelectric means for generating an electrical potential in response to pressure applied thereto, spring means supported as a cantilever on the shuttle, the spring means having mounted thereon a hammer for striking the piezoelectric means, and means on the apparatus for cocking the hammer during movement of the shuttle towards the retracted position.

3. Photographic apparatus for effecting exposure and initiating processing in serial fashion of a plurality of self-processing film units supported therein in superposed stacked relationship, the apparatus including exposure means for exposing a foremost one of said film units, pressure applying means for initiating processing of said foremost film unit, a translatable shuttle movement between a retracted position and an advanced position and operatively associated with said exposure means, the shuttle including film unit engaging means for advancing the exposed foremost film unit from the exposure position to a position in which it may be received by the pressure applying means, means for restraining the shuttle in the advanced position after receipt of the exposed foremost film unit by the pressure means, spring means for urging the shuttle towards the retracted position in which position the film unit engaging means is adapted to be disposed for engagement of the next succeeding film unit after such film unit has been exposed, body release means for actuating the exposure means to effect exposure of said next succeeding film unit by effecting the release of the shuttle from the restraining means to permit movement of the shuttle towards the retracted position; piezoelectric means for generating electrical energy; hammer means supported on the shuttle for striking the piezoelectric means to generate electrical energy during movement of the shuttle towards the retracted under the force of the spring means; and means responsive to the movement of the shuttle towards the retracted position for cocking the hammer means.

4. Photographic apparatus for effecting exposure and initiating processing of a self-processing film unit, the apparatus comprising:

means for locating a film unit in position for exposure;
exposure means for exposing the film unit;
pressure applying means for receiving a film unit and for initiating the processing of the film unit after the exposure;

a shuttle including film unit engaging means for advancing the film unit from an exposure position to a position in which it may be received by the pressure applying means;

means for supporting the shuttle for pivotal and translational movement;

spring means for biasing the shuttle for pivotal and translational movement of the film unit engaging means in a direction away from said pressure applying means and towards a retracted position wherein the film unit engaging means is disposed to engage a film unit in its exposure position and is adapted upon movement of the shuttle towards an advanced position to engage the film unit to initiate advancement of the film unit towards the pressure applying means;

drive means for translating the shuttle from the retracted position towards the advanced position to introduce the film unit into the pressure applying means;

restraint means for supporting the shuttle in the advanced position and for preventing the return of the shuttle to its retracted position under the bias of the spring means;

means including body release means actuatable by the operator of the apparatus for initiating exposure of a film unit by removing the restraint upon the shuttle to permit the shuttle to translate towards the retracted position under the bias of the spring means without contact of the film unit by the film engaging means; and means pivotably and slidably coupled to the shuttle and responsive to the movement of the shuttle from the advanced position towards the retracted position and operatively associated with the exposure means for effecting commencement of the exposure of the film unit by the exposure means.

5. Photographic apparatus for effecting exposure and initiating removal of a self-processing film unit from an exposure position in the apparatus, the apparatus comprising:

means for locating a film unit in a position for selective exposure of the film unit;
exposure means for exposing the film unit;

a shuttle movable from a retracted position to an advanced position and including film unit engaging means for advancing the film unit at least partially from the exposure position during movement of the shuttle from the retracted position to the advanced position;

means for supporting the shuttle for pivotal and translational movement;

spring means for biasing the shuttle for pivotal and translational movement of the film unit engaging means in a direction away from the advanced position of the shuttle and towards the retracted position wherein the film unit engaging means is disposed to engage a film unit in its exposure position;

drive means for translating the shuttle from the retracted position to the advanced position;

restraint means for supporting the shuttle in the advanced position and for preventing the return of the shuttle to its retracted position under the bias of the spring means;

body release means actuatable by the operator of the apparatus for initiating exposure of a film unit by pivoting the shuttle away from the restraint means to remove the restraint upon the shuttle and to thereby permit the shuttle to translate towards the retracted position under the bias of the spring means; and means coupled to the shuttle and responsive to the movement of the shuttle from the advanced position towards the retracted position and operatively associated with the exposure means for effecting commencement of the exposure of the film unit by the exposure means.

6. The apparatus of claim 5 and including piezoelectric means for generating an electrical potential in response to pressure applied thereto, spring means supported as a cantilever on the shuttle, the spring means having mounted thereon a hammer for striking the piezoelectric means, and means on the apparatus for cocking the hammer during movement of the shuttle towards the retracted position.

7. Photographic apparatus for effecting exposure and initiating removal of a self-processing film unit from an exposure position on the apparatus, the apparatus comprising:

means for locating a film unit in a position for selective exposure;

exposure means for exposing the film unit;

a shuttle movable between a retracted position and an advanced position and including film unit engaging means for advancing the film unit from the exposure position, the shuttle further including means for receiving a projection to provide a restraint against translational movement of the shuttle from the advanced position;

means for supporting the shuttle for pivotal and translational movement;

spring means for biasing the shuttle for pivotal and translational movement of the shuttle in a direction away from the advanced position and towards the retracted position wherein the film unit engaging means is disposed to engage a film unit in its exposure position;

drive means for translating the shuttle from the retracted position to the advanced position to initiate removal of the self-processing film unit from the exposure position;

body release means actuatable by the operator of the apparatus for initiating exposure of a film unit by removing the restraint upon the shuttle to permit the shuttle to translate towards the retracted position under the bias of the spring means, the body release means being supported on the apparatus for pivotal movement about an axis and including first and second projections that are spaced from said axis with said first projection being closer to the axis than the second projection, said first projection being receivable by said shuttle projection receiving means to comprise the restraint, and said second projection being cooperable with the shuttle to pivot the shuttle so as to release the restraint upon pivotal movement of the body release about said axis; and means coupled to the shuttle and responsive to the movement of the shuttle from the advanced position towards the retracted position and operatively associated with the exposure means for effecting commencement of the exposure of the film unit by the exposure means.

8. The apparatus of claim 7 and including piezoelectric means for generating an electrical potential in response to pressure applied thereto, spring means supported as a cantilever on the shuttle, the spring means having mounted thereon a hammer for striking the piezoelectric means, and means on the apparatus for cocking the hammer during movement of the shuttle towards the retracted position.

* * * * *

UNITED STATES PATENT OFFICE
CERTIFICATE OF CORRECTION

PATENT NO. : 4,107,710
DATED : August 15, 1978
INVENTOR(S) : Donald M. Harvey

It is certified that error appears in the above-identified patent and that said Letters Patent are hereby corrected as shown below:

Column 6, line 4, delete "shutter" and insert --shuttle-- in its place.

Column 9, line 61, delete "ment" and insert --able-- in its place.

Column 9, line 64, after "from" delete "the" and insert --an-- in its place.

Column 10, line 13, after "retracted" insert --position--.

Column 11, line 46, delete "on" and insert --in-- in its place.

Signed and Sealed this

Twenty-seventh Day of February 1979

[SEAL]

Attest:

RUTH C. MASON
Attesting Officer

DONALD W. BANNER
Commissioner of Patents and Trademarks